(12) United States Patent
Yang et al.

(10) Patent No.: US 7,802,451 B2
(45) Date of Patent: Sep. 28, 2010

(54) MANUFACTURING DEVICE FOR PRODUCING MINERAL FIBERS FROM INCINERATOR ASHES AND ITS PLASMA-VITRIFIED SLAG

(75) Inventors: Sheng-Fu Yang, Kaohsiung County (TW); Yung-Woou Lee, Taipei County (TW); To-Mai Wang, Taipei County (TW); Wen-Cheng Lee, Taoyuan County (TW); Kin-Seng Sun, Taoyuan County (TW); Ching-Liang Chen, Taoyuan County (TW); Chin-Ching Tzeng, Taipei County (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 484 days.

(21) Appl. No.: 11/889,720

(22) Filed: Aug. 15, 2007

(65) Prior Publication Data

US 2009/0044570 A1   Feb. 19, 2009

(51) Int. Cl.
*C03B 5/00* (2006.01)
(52) U.S. Cl. .................. 65/134.1; 65/454; 65/462; 65/463; 65/465; 65/524; 65/134.8; 65/135.1; 65/135.9
(58) Field of Classification Search ............ 65/454, 65/462, 463, 465, 478, 488, 524, 134.1, 134.8, 65/135.1, 135.9
See application file for complete search history.

(56) References Cited

U.S. PATENT DOCUMENTS

| | | | | |
|---|---|---|---|---|
| 2,921,342 | A * | 1/1960 | Siefert et al. | 65/476 |
| 3,192,024 | A * | 6/1965 | Denniston | 65/437 |
| 3,573,017 | A * | 3/1971 | Griem, Jr. | 65/384 |
| 3,669,435 | A * | 6/1972 | Silverberg | 432/151 |
| 3,779,731 | A * | 12/1973 | Pollock et al. | 65/29.11 |
| 3,902,878 | A * | 9/1975 | Hoag et al. | 65/447 |
| 4,230,471 | A * | 10/1980 | Levecque et al. | 65/503 |
| 4,294,603 | A * | 10/1981 | Winzer et al. | 65/346 |
| 4,410,347 | A * | 10/1983 | Krumwiede | 65/27 |
| 5,643,350 | A * | 7/1997 | Mason et al. | 65/158 |
| 5,693,110 | A * | 12/1997 | Iwaihara et al. | 65/29.11 |
| 6,532,768 | B1 * | 3/2003 | Labrot et al. | 65/29.16 |
| 6,938,441 | B1 * | 9/2005 | Hajek et al. | 65/33.2 |
| 7,497,094 | B2 * | 3/2009 | Takagi et al. | 65/134.5 |
| 2006/0144089 | A1 * | 7/2006 | Eichholz et al. | 65/29.21 |

* cited by examiner

*Primary Examiner*—Queenie Dehghan
(74) *Attorney, Agent, or Firm*—Jackson IPG PLLC; Demian K. Jackson (57) ABSTRACT

Incinerator ashes, which is obtained after treating municipal solid waste, incinerator ashes or its plasma vitrified slag is made into mineral fibers. Cullet is added during manufacturing the mineral fibers for conditioning. The mineral fibers thus obtained have a good strength and could raise value of recycled product. In addition, it could reduce impact of the incinerator ashes to the environment and environmental protection is achieved.

12 Claims, 7 Drawing Sheets

MANUFACTURING DEVICE FOR PRODUCING MINERAL FIBERS FROM INCINERATOR ASHES AND ITS PLASMA-VITRIFIED SLAG

FIELD OF THE INVENTION

The present invention relates to treating incinerator ashes and, more particularly, relates to manufacturing mineral fibers from incinerator ashes or plasma-vitrified slag by adding glass to reduce a CaO/SiO2 basicity.

DESCRIPTION OF THE RELATED ARTS

Incinerator ashes contain hazardous heavy metals, dioxins, etc., which are harmful to human beings and the environment. A plasma melting technology is used to melt the incinerator ashes and the lava formed flows into a water-quenching tank for obtaining a water-quenched slag. The water-quenched slag is made into mineral fibers in the following ways to reduce impact of the incinerator ashes to the environment and also so that the mineral fibers formed can be utilized as a recycled product.

In the early days, the water-quenched slag was made into long fibers or short fibers. The fibers are coated with an organic coating to protect the fibers from abrasion and to avoid the fibers linking with each other. In general, an organic adhesive is coated on a cylindrical mineral fiber screen. A part of the organic adhesive is evaporated before contacting with the mineral fiber screen. The evaporated organic adhesive becomes a contaminant in an air flow obtained on manufacturing the fibers and so it must be gotten rid of to avoid contamination. In addition, the organic adhesive remaining on the mineral fibers may become sticky.

On the other hand, a prior art of a high pressure blowing method is used to manufacture mineral fibers. However, it is of high danger and the fibers contain a lot of shots. The mineral fibers from above manufacturing process are low density and do not have enough strength or stretch. Hence, the prior arts cannot fulfill all users' requests on actual use.

SUMMARY OF THE INVENTION

The main purpose of the present invention is to manufacture mineral fibers from incinerator ashes or plasma vitrified slag by adding glass to reduce CaO/SiO2 basicity.

Another purpose of the present invention is to manufacture mineral fibers which can be utilized as a recycled product. At the same time, the problems of disposing of incinerator ashes and recycle the waste into a valuable recycled product can be solved.

To achieve the above purposes, the present invention is a device for manufacturing mineral fibers from incinerator ashes or plasma vitrified slag, comprising an automatic feeding unit, a heating unit, a mineral fiber blowing unit, a mineral fiber collection unit, a waste gas and escaped mineral fiber treatment unit, a data recording and acquisition unit and a power supply, where incinerator ashes, plasma vitrified slag and cullet are added together in a ratio or individually to obtain high quality mineral fibers and, by doing so, the problems of disposing incinerator ashes and recycle the waste into a valuable recycling product are solved. Accordingly, a novel device of manufacturing mineral fibers from incinerator ashes or plasma-vitrified slag is obtained.

BRIEF DESCRIPTION OF THE DRAWINGS

The present invention will be better understood from the following detailed description of figures, in which.

DESCRIPTION OF THE PREFERRED EMBODIMENT

The following description of the preferred embodiment is provided to understand the features and the structures of the present invention.

Please refer to FIG. 1 to FIG. 6, which are a structural view showing a preferred embodiment according to the present invention; a structural view showing an automatic feeding unit and a heating unit; a detailed view showing the heating unit; and structural views showing a mineral fiber blowing unit, a mineral fiber collection unit and a waste gas and escaped mineral fiber treatment unit. As shown in the figures, the present invention is a device for manufacturing mineral fibers from incinerator ashes or plasma vitrified slag, comprising an automatic feeding unit 1, a heating unit 2, a mineral fiber blowing unit 3, a mineral fiber collection unit 4, a waste gas and escaped mineral fiber treatment unit 5, a data recording and acquisition unit 6 and a power supply 7, where incinerator ashes containing bottom ash or fly ash as main components, which more particularly is plasma vitrified slag including air-cooled slag and a water-quenched slag obtained from a plasma melting of the bottom ash or the fly ash, is used as a material for manufacturing mineral fibers which have a high financial value. By using the present invention, related environmental issues from incinerator ashes are avoided and the mineral fibers obtained can be further used as high value recycled products, like sound-absorbing board, additives of construction fill materials, additives of construction spray materials, etc.

Figure 1:
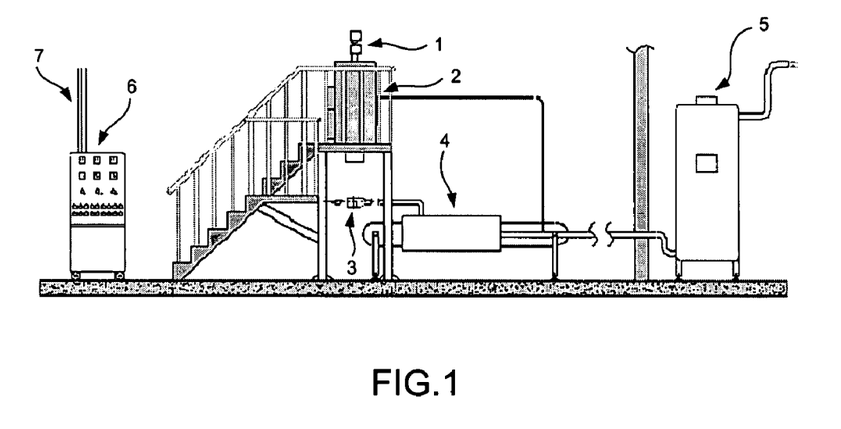
FIG. 1 is the structural view showing the preferred embodiment according to the present invention.
Figure 2:
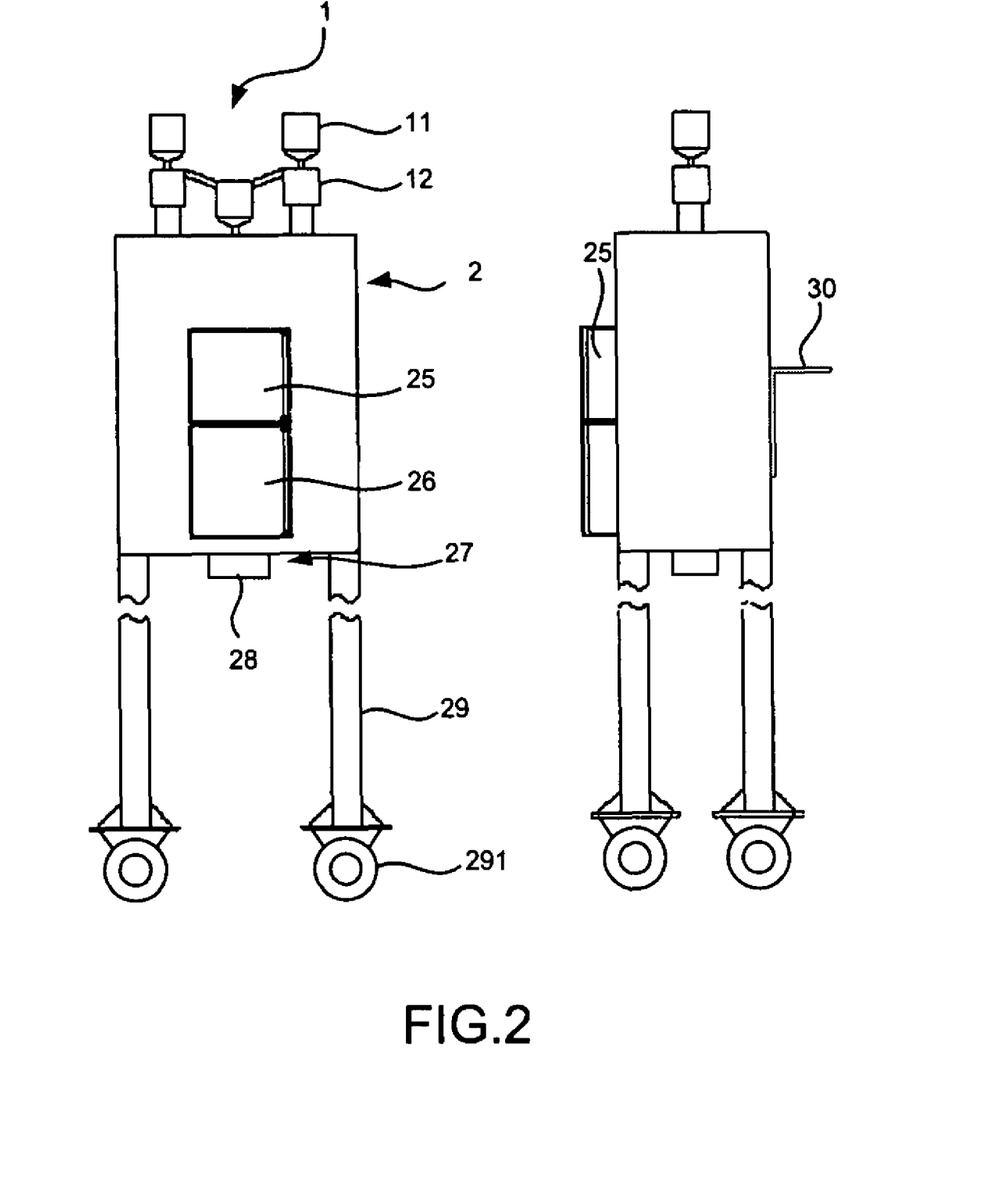
FIG. 2 is the structural view showing the automatic feeding unit and the heating unit.
Figure 3:
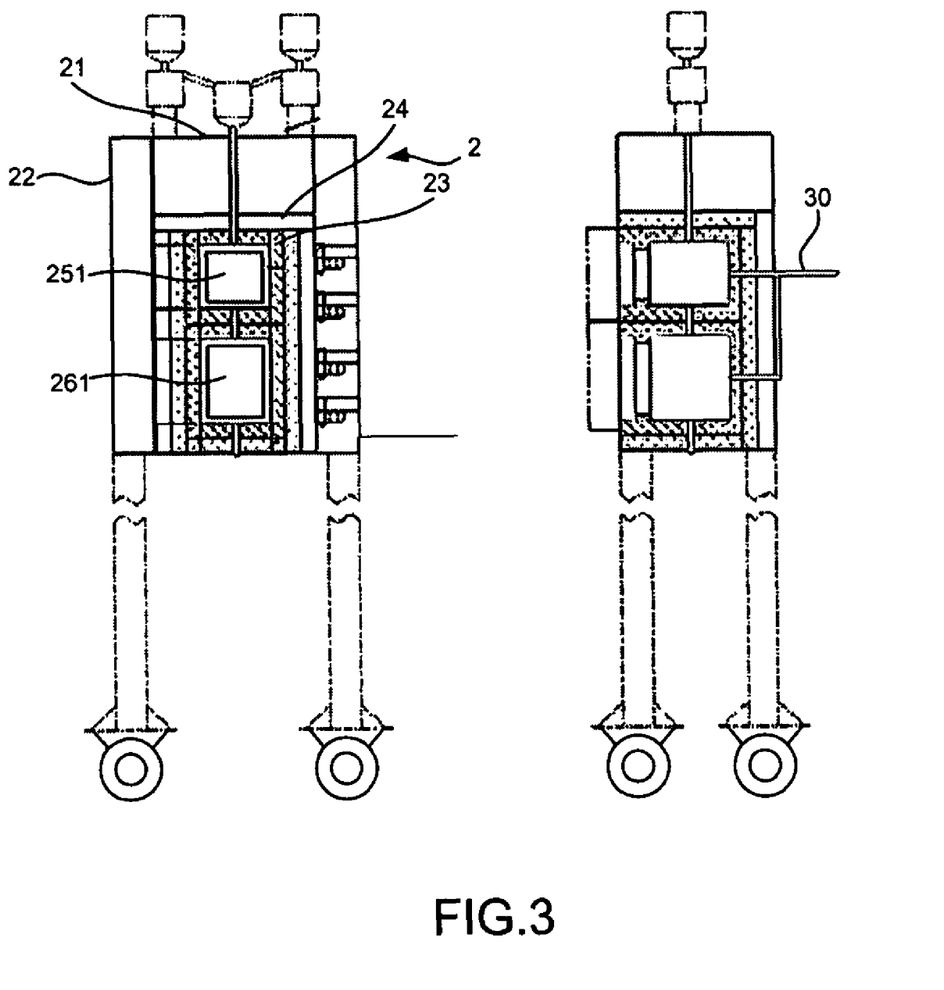
FIG. 3 is the detailed view showing the heating unit.

On using the present invention, incinerator ashes, plasma vitrified slag and cullet are added together in a ratio or individually and put in feeding hoppers 11 to be fed into the heating unit 2 by two automatic vibration machines 12 in sequence connected in the automatic feeding unit 1. The materials are mixed and melted in a melting furnace 25 of the heating unit 2 to obtain lava. Then a temperature of the lava is adjusted and fixed at a required value through a constant temperature furnace 26. A flow rate of the lava is fixed by using a drive tube and a lava exit as well as an overflow recycling unit 28 at an indirect heating device 27 of the heating unit 2.

Figure 4:
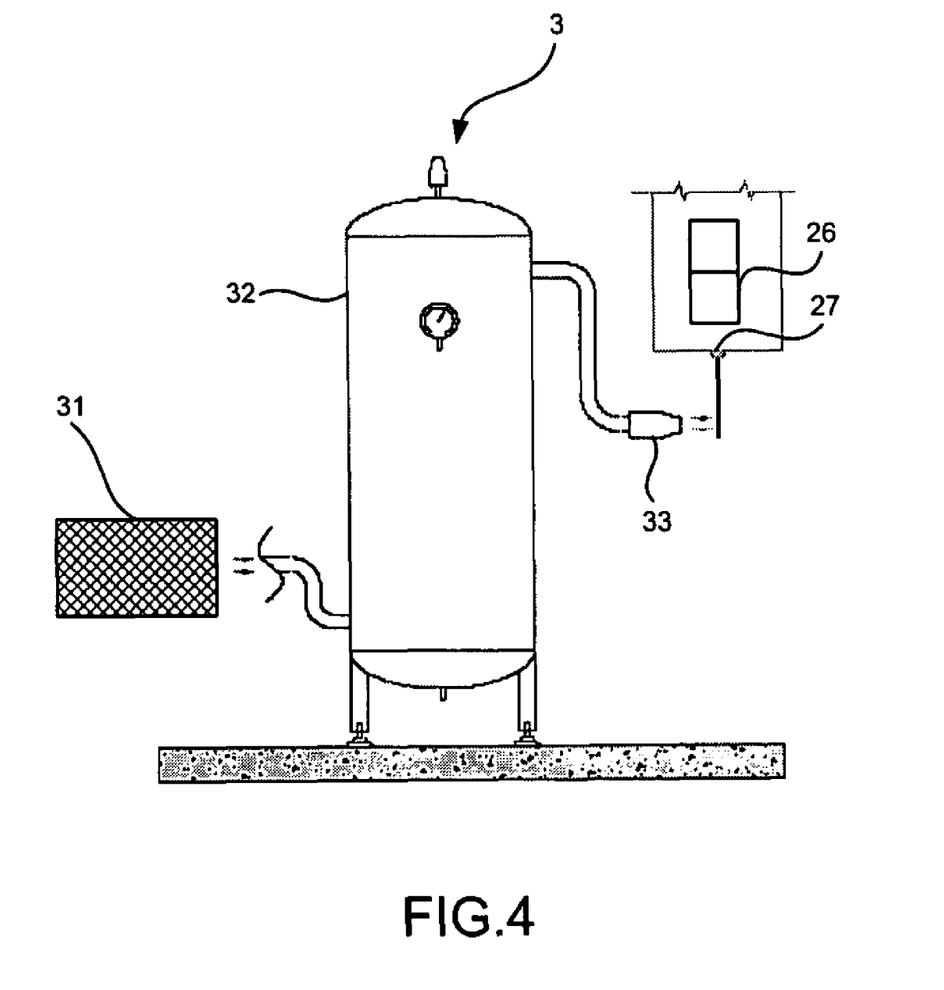
FIG. 4 is the structural view showing the mineral fiber blowing unit.

The lava flows to the mineral fiber blowing unit 3 after flowing through the indirect heating device 27. A high-pressure air is supplied by an air supplier 31 of the mineral fiber blowing unit 3, like an air compressor, and the high-pressure air is stored in an air-storage tank 32. The high-pressure air in the air-storage tank 32 blows the lava obtained from the constant temperature furnace 26 into mineral fibers to enter the mineral fiber collection unit 4.

Figure 5:
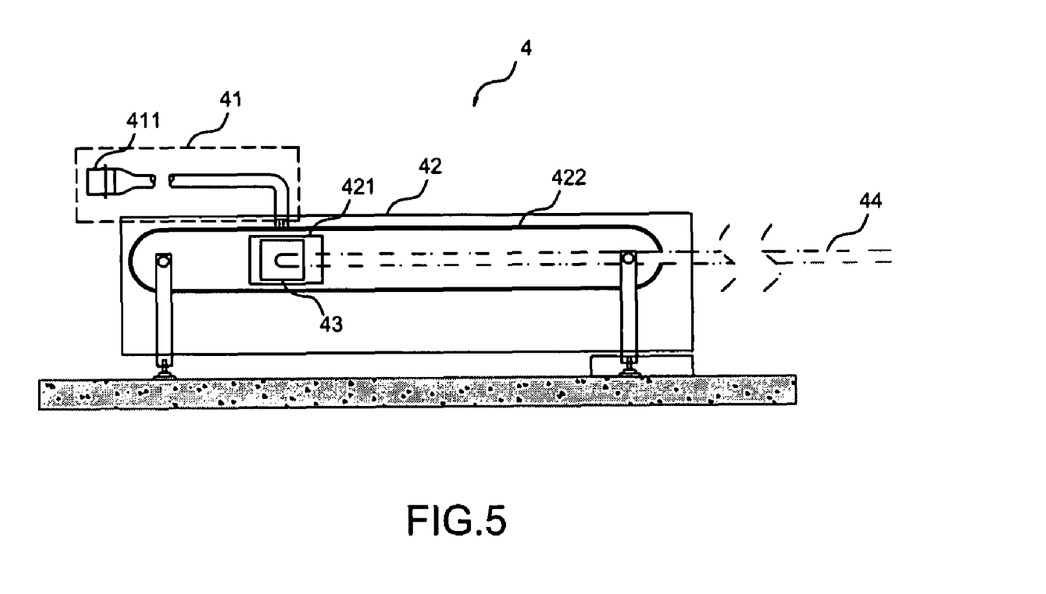
FIG. 5 is the structural view showing the mineral fiber collection unit.
Figure 6:
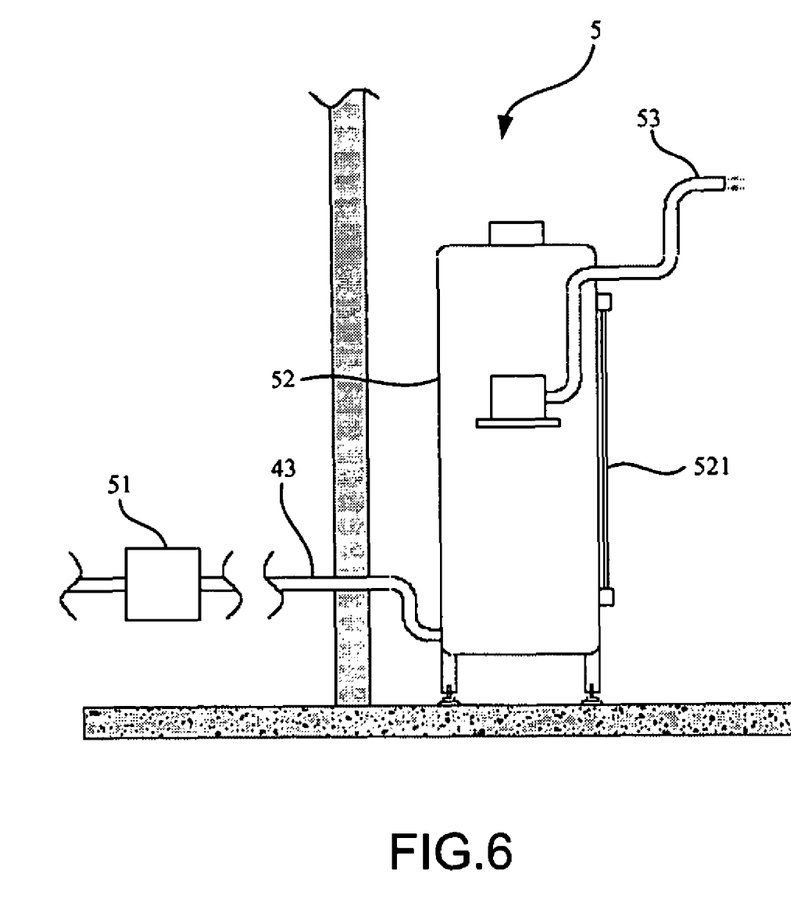
FIG. 6 is the structural view showing the waste gas and escaped mineral fiber treatment unit.

The mineral fiber collection unit 4 uses an interception conveyer 422 to collect the mineral fibers and then cools them down for finishing the manufacture of the mineral fibers. The mineral fibers obtained are heat-resistant, fire-proof, etc. and thus can be further made into a heat-resistant and fire-proof product, a sound-absorbing board, additives of aggregate, additives of construction fill materials, additives of construction spray materials, etc. The waste gas and escaped mineral fibers produced in the above process enter the waste gas and escaped mineral fiber treatment unit 5 through an exhaust duct 44. The waste gas and escaped mineral fiber treatment unit 5 uses a wet scrubber 52 and a liquid gauge 521, to remove the waste gas and the escaped mineral fibers from the exhaust duct 44 and then is exhausted from another exhaust duct 53. Therein, the above process of inputting the materials; heating and melting the materials into the lava; blowing the lava into the mineral fibers; collecting and cooling down the mineral fibers; and removing the waste gas and the escaped mineral fibers are monitored and controlled by the data recording and acquisition unit 6 and are supplied with power by the power supply 7.

Figure 7:
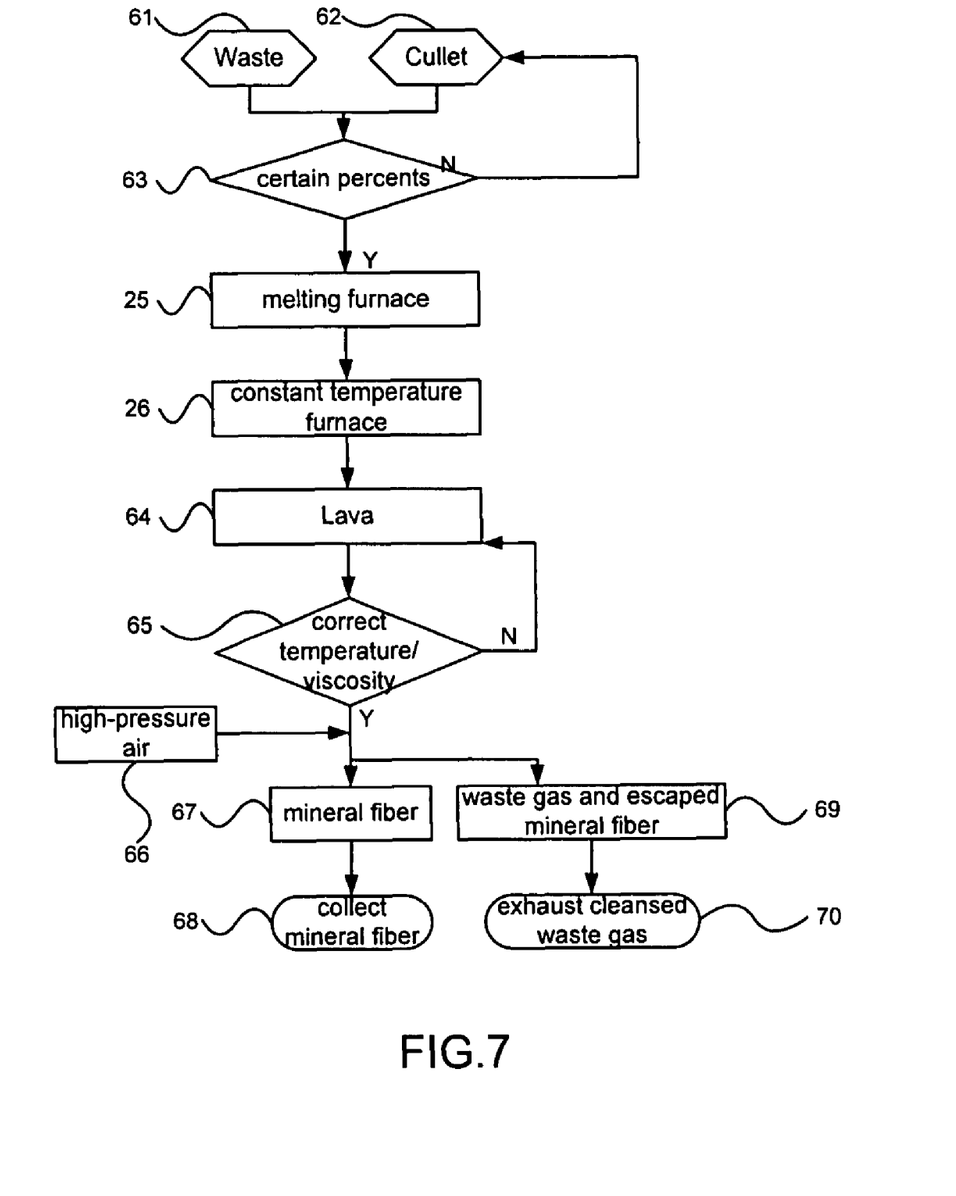
FIG. 7 is the flow chart showing the manufacture of mineral fibers.

Please further refer to FIG. 7, which is a flow chart showing manufacture of mineral fibers. As shown in the figure, for conditioning the lava, the automatic feeding unit 1 comprises two automatic vibration machines 12. The automatic feeding unit 1 receives programmatic controls through an input flow controller from a programmable logic controller (PLC) (not shown in the figure) for controlling an inflow to the heating unit 2, while granular sizes of the waste 61 and the cullet 62 are controlled by a filter (not shown in the figure). Thus, the waste 61 and the cullet 62 enter the heating unit 2 in a certain rate with a certain amount. The whole process is controlled by the PLC for achieving certain percents 63 of the waste 61 and cullet 62.

For achieving requirements of heating and controlling the lava in the heating unit 2, the heating unit 2 comprises an outer shell 21 of a thickness more than 2.5 millimeters (mm); an air-cooling jacket 22 with a stainless steel on the outer shell 21; a melting furnace 25; and a constant temperature furnace 26. And the heating unit 2 has four fixed feet 29 and four movable wheels 291, where the heating unit 2 is operated at a temperature between 900 and 1600 Celsius degrees (° C.) and has a surface temperature below 65° C.

Each of the melting furnace 25 and the constant temperature furnace 26 has an inner wall of a fireproof ceramic fiber plate 23 of aluminum oxide (Al2O3) and an outer wall of insulation ceramic fiber plate 24 of Al2O3. Therein, the fireproof ceramic fiber plate 23 resists a temperature more than 1800° C. and the insulation ceramic fiber plate 24 resists a temperature more than 1500° C. Both of the melting furnace 25 and the constant temperature furnace 26 has a plasma torch heater (not shown in the figure) and two R-type thermocouples (not shown in the figure), which has a temperature measuring range between 900 and 1600° C.

The melting furnace 25 and the constant temperature furnace 26 comprise a melting furnace crucible 251 and an acceptor crucible 261 respectively, where the melting furnace crucible 251 is made of 98% of aluminum oxide and the acceptor crucible 261 is made of a molten-cast refractory. The overflow recycling unit 28, as an output of the constant temperature furnace 26, is set at the indirect heating device 27 under the acceptor crucible 261 and has a working temperature between 900 and 1600° C. With the above structure, a temperature is controlled to melt the mixed materials through the melting furnace crucible 251 in the melting furnace 25. A temperature of the lava 64 in the acceptor crucible 261 is adjusted in the constant temperature furnace 26 to reach a required value. Then the lava 64 flows through the drive tube, the lava exit and the indirect heating device 27 and, then, output of the lava 64 flow is set to a fixed amount coordinated with the overflow recycling unit 28.

The nozzle 33 of the mineral fiber blowing unit 3 has an outer diameter of 1 inch, made of stainless steel and is movable leftward, rightward, upward, downward, forward and backward in three dimensional movement. The air supplier 31 of the mineral fiber blowing unit 3, like an air compressor, supplies a high-pressure air 66 to be stored in the air-storage tank 32. Then the high-pressure air 66 in the air-storage tank 32 is blown from the nozzle 33. The mineral fiber blowing unit 3 has an emulsifier feeding device (not shown in the figure) for supplying an emulsifier at a rate of 0 to 1,000 milliliter (ml) per minutes, while the nozzle 33 supplies the high-pressure air 66 required for blowing the lava from the lava exit. Thus, the mineral fibers 67 are prevented from getting together. Therein, if the desired temperature and viscosity are not achieved 65, adjustment and remelt by the heating unit 2 can occur again.

The collection duct 41 of the mineral fiber collection unit 4 has a collection funnel 411 to make the mineral fibers 67 enter a collection box 42, where the collection box 42 comprises an exhaust interior box 421 and the interception conveyer 422. The mineral fibers are collected 68 and cooled down in the exhaust interior box 421 through the interception conveyer 422. At the same time, the waste gas and the escaped mineral fibers are transported to the waste gas and escaped mineral fiber treatment unit 5 by an exhaust fan motor 43 and the exhaust duct 44, where a collecting efficiency of the interception conveyer 422 is more than 99.9% and a rotating speed of the interception conveyer 422 is 2 to 500 cycles per minute which controlled by a frequency converter.

The waste gas and escaped mineral fiber treatment unit 5 comprises the exhaust machine 51 and the wet scrubber 52 connected with an end of the exhaust duct 44. The wet scrubber 52 comprises the liquid gauge 521. The exhaust machine 51 makes the waste gas and the escaped mineral fibers in the exhaust duct 44 enter the wet scrubber 52. The liquid gauge 521 controls a liquid level of the wet scrubber 52. The treated waste gases are exhausted 70 from the exhaust duct 53.

We summarize that the present invention is a device for manufacturing high-quality and high-value mineral fibers from incinerator ashes or plasma vitrified slag. The mineral fibers can be made into a sound-absorbing board, additives of aggregate, additives of construction fill materials, additives of construction spray materials, etc. and, thus, high-quality and high-value recycled product is obtained and an environmental protection issue of incinerator ashes is prevented.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A device for manufacturing mineral fibers from incinerator ashes or plasma vitrified slag, comprising:
   an automatic feeding unit, said automatic feeding unit connecting two automatic vibration machines and controlling feedings of waste and cullet therefrom;
   a heating unit, said heating unit comprising an outer shell, an air-cooling jacket, a melting furnace, a constant temperature furnace, and an overflow recycling unit the heating unit melting a mixture of said waste and said cullet into lava and adjusting a temperature of said lava to a required value;

a mineral fiber blowing unit, said mineral fiber blowing unit blowing the lava to obtain mineral fibers formed from the blown lava;

a mineral fiber collection unit, said mineral fiber collection unit filtering and collecting said mineral fibers from said mineral fiber blowing unit and then cooling the collected mineral fibers;

a waste gas and escaped mineral fiber treatment unit, said waste gas and escaped mineral fiber treatment unit processing waste gas and escaped mineral fibers received from the mineral fiber collection unit via an exhaust duct;

a data recording and acquisition unit, said data recording and acquisition unit monitoring a process of manufacturing said mineral fibers; and a power supplier, said power supplier supplying power;

wherein said melting furnace and said constant temperature furnace comprise a melting furnace crucible and an acceptor crucible respectively;

wherein said acceptor crucible comprises the overflow recycling unit, which has a diameter of 3 millimeter (mm) and is an output of said constant temperature furnace;

wherein said overflow recycling unit is capable of being moved for 50 mm at a direction selected from a group consisting of an upward direction and a downward direction, and is capable of being turned at 180 degrees; and wherein said overflow recycling unit has a working temperature between 900 and 1600° C.

2. The device according to claim 1,
wherein said automatic vibration machine is fed with said waste and said cullet and feeds the waste and cullet in a mixing way or a separate way.

3. The device according to claim 1,
wherein said automatic vibration machine receives a programmatic control through an input flow controller from a programmable logic controller (PLC) to control said feeding of said waste and said glass as a coordination to said heating unit; and
wherein said automatic vibration machine controls granular sizes of said waste and said glass with a filter.

4. The device according to claim 1,
wherein said outer shell has a thickness more than 2.5 mm.

5. The device according to claim 1,
wherein both of said melting furnace and said constant temperature furnace has a plasma torch heater.

6. The device according to claim 1,
wherein both of said melting furnace and said constant temperature furnace has an inner wall and an outer wall made of aluminum oxide (Al2O3).

7. The device according to claim 1,
wherein both of said melting furnace and said constant temperature furnace has two R-type thermocouple, which have a temperature measuring range between 900 and 1600 Celsius degrees (° C.).

8. The device according to claim 1,
wherein said heating unit has four fixed feet and four movable wheels.

9. The device according to claim 1,
wherein said mineral fiber blowing unit has a nozzle, an air supplier and an emulsifier feeding device.

10. The device according to claim 9,
wherein said nozzle has an outside diameter of 1 inch and is movable leftward, rightward, upward, downward, forward and backward in three dimensional movement.

11. The device according to claim 1,
wherein said mineral fiber collection unit comprises a collection duct, a collection box, an exhaust interior box and an interception conveyer.

12. The device according to claim 1,
wherein said waste gas and escaped mineral fiber treatment unit comprises an exhaust machine; said exhaust duct connected with an exhaust motor; and a wet scrubber connected at an end of said exhaust duct.

* * * * *